April 30, 1940.  R. N. JANEWAY  2,198,668
RAILWAY VEHICLE
Filed May 29, 1937  2 Sheets-Sheet 2
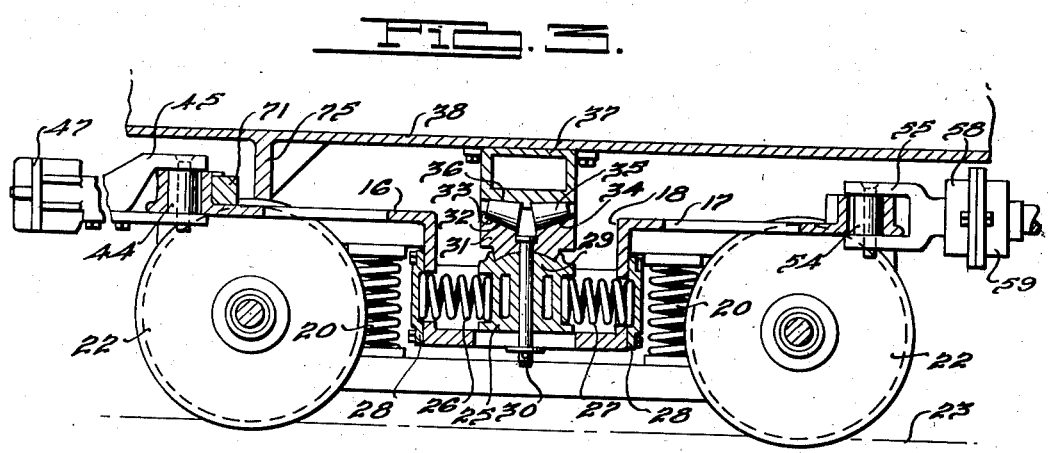
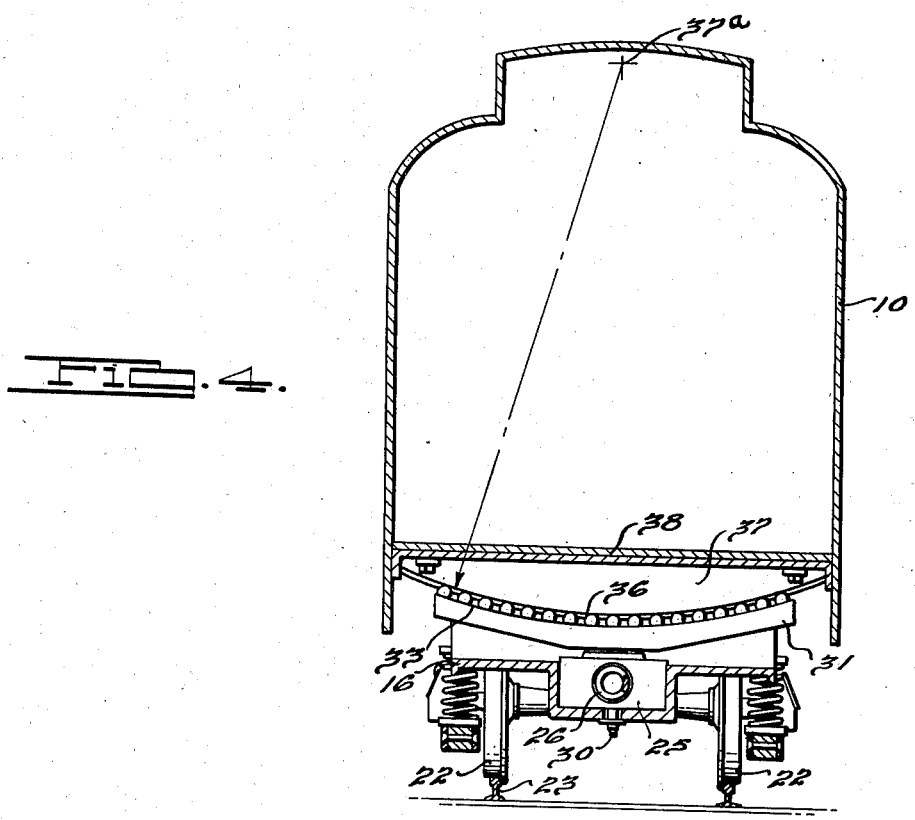
INVENTOR
ROBERT N. JANEWAY.
BY
Harness, Lind, Pater & Harris
ATTORNEYS.

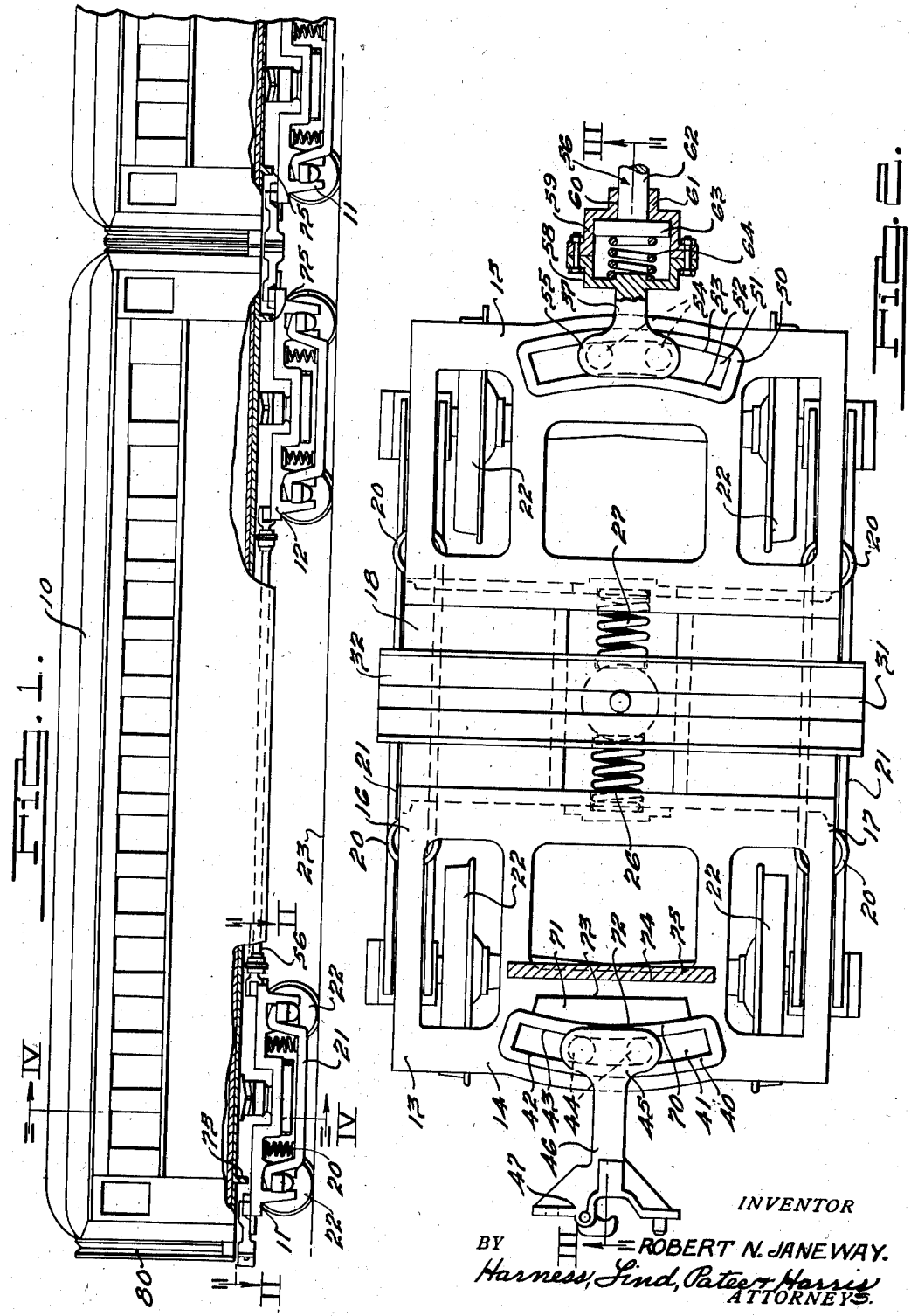

Patented Apr. 30, 1940

2,198,668

UNITED STATES PATENT OFFICE 2,198,668

RAILWAY VEHICLE

Robert N. Janeway, Detroit, Mich., assignor to Chrysler Corporation, Highland Park, Mich., a corporation of Delaware Application May 29, 1937, Serial No. 145,478

12 Claims. (Cl. 105—199)

My invention relates to vehicles and particularly to vehicles adapted to be pulled or drawn over rails or tracks for the transportation of passengers and freight.

In a railroad train it is necessary that each car serve as a means of transmitting forces, both tensional and compressional, from the engine or adjoining cars to all of the cars connected to its opposite end. It is customary to transmit such forces through the bodies of the cars. This places each car body under a strain, especially when the train is being pulled or pushed around curves in the track, which prevents freedom of movement of that car body on its springs, and causes any disturbing forces arising throughout the train to be exerted on adjacent car bodies until dissipated.

One object of my invention is to eliminate, as far as possible, the use of the car bodies as means for transmitting forces throughout trains, thus leaving the bodies free to move on their springs to provide improved riding qualities.

A further object of my invention consists in providing means whereby all tensional forces and all moderate compressional forces are transmitted through the vehicle independently of the car body and wherein the car body is employed as a force transmitting means only when the vehicle is subjected to relatively high compressive forces.

A still further object of my invention is to provide a means wherein the car supporting trucks are movable longitudinally of the car body and in which resilient means oppose the relative displacement of said car trucks and car body.

An additional object of my invention consists in providing a railway car construction in which draft means adapted to cushion forces transmitted through a train are disposed between the trucks and their associated car bodies.

Further objects of my invention will be apparent from the following detailed description of several illustrative embodiments of my invention, reference being had to the accompanying drawings, in which:

Fig. 1 is a side view, partially in elevation and partially in cross-section, of one complete railway car and a portion of a second car both embodying my invention.

Fig. 2 is a plan view of one of the trucks illustrated in Fig. 1, the view being taken along the line II—II thereof.

Fig. 3 is a longitudinal cross-sectional view of the truck illustrated in Fig. 2, the section being taken along the line III—III thereof.

Fig. 4 is a transverse cross-sectional view of the car illustrated in Fig. 1, the section being taken along the line IV—IV thereof.

In the drawings I have illustrated a railway car 10 mounted upon trucks 11 and 12, the two trucks being identical in construction although reversed in direction. Each of the trucks consists of a truck frame 13 consisting of end portions 14 and 15 and side portions 16 and 17, the central portions of the side portions 16 and 17 being provided with a depressed portion 18. The weight of the truck is borne on coil springs 20 disposed between the side portions 16 and 17 and equalizer bars 21, which transmit the weight therethrough to the truck wheels 22, which in turn roll on the usual railroad tracks or rails 23.

A bolster member 25 is mounted in the depressed portion 18 of the truck frame in such manner that it may rest on and slide longitudinally of the truck frame. The bolster member 25 is normally maintained in a central position within the depressed portion 18 by means of two compression springs 26 and 27, which may be preloaded, if desired, disposed one on each side of the bolster 25, and having their opposite ends in engagement with plates 28, which are secured to the vertical side walls of the depressed portion 18 of the truck frame. The bolster 25 is provided at its central portion with a center bearing 29 through the axis of which extends a vertically arranged king pin 30.

Rotatively mounted on the center bearing 29 is a second cooperating bearing 31 which constitutes a support for a track member 32 extending transversely of the truck frame. The track member 32 consists of two relatively inclined arcuate faces 33, 34 on which are mounted a plurality of tapered rollers 35, the upper sides of which engage a correspondingly arcuate upper track member 36, constituting the lower surface of a transversely extending frame member 37, secured to the bottom portion 38 of the car body 10. The roller members 35 serve the purpose of supporting the car body on the bolster member 25 in such manner it may tilt about an axis determined by the axis of the arcs of the surfaces 33, 34 and 36, as indicated at 37ª in Fig. 4. The axis 37ª extends longitudinally of the car body and may be placed at any desired height, it being primarily essential that the axis 37ª be located at a point above the center of gravity of the car body, when the latter is in its normal upright position, so that the car body will tend to remain in a normal position with the floor horizontal unless some force is present to alter that position.

With the foregoing construction, when a train passes around a curve in a railroad track the transversely extending roller track member 32 will rotate on the center bearing 29 as the truck rotates with respect to the car body. Also, the car body will tilt or incline about the axis 37ª, owing to the effect of centrifugal force on the car body. The degree of tilting will depend upon the speed of the train, and the radius of curvature of the track, but with the car body free to tilt to any desired position it will tilt in such manner as to compensate for the lateral unbalancing effect of the centrifugal force being exerted thereon. As a result, objects carried within the car body will not be unbalanced by the effect of the centrifugal force caused by the train passing around the curve in the track. In like maner, if the train happens to stop on a banked curve in the track the car body will immediately be freed of all centrifugal forces acting thereon and the car will move to a position in which the center of gravity is directly beneath the axis 37ª, thus maintaining the floor 38 of the car horizontally even though the trucks are standing on an inclined track.

The rollers 35 may be cylindrical if desired or there may be but a single set of rollers operating on a flat arcuate track, the advantage of the tapered rollers and inclined tracks being that they tend to prevent longitudinal displacement of the car body with respect to the supporting trucks. However, this displacement may be prevented in various other suitable ways.

The end portion 14 of the truck frame 13 is provided with a guide member 40, which is bolted or otherwise suitably secured to the frame member. The guide member 40 is provided with a recess 41 defining two arcuate tracks 42 and 43, between which are confined two roller members 44. The roller members 44 are of a slightly smaller diameter than the distance between the arcuate tracks 42 and 43 so that they may roll on either of the two tracks without frictionally engaging the other. The two tracks 42 and 43 represent arcs drawn about the axis of the central point of the truck frame 13, which is the center of suspension of the truck. The roller members 44 are rotatably mounted upon a suitable support 45, secured to the end of a drawbar 46, on the opposite end of which is secured a coupling member 47, of the rigid type so that when the coupling member 47 is fastened to the cooperating coupling member of a second car the two drawbars are secured in rigid association so that no bending will occur therebetween.

With this construction it will be apparent that the drawbar 46 may be moved laterally of the car end but is confined to an arcuate path representing an arc about the axis of the center of suspension of the truck. As a result, any tensional or compressional forces exerted by the drawbar on the truck frame will have an effective center of application at the center of suspension of the truck, regardless of the angularity of the drawbar with respect to the truck frame. It will also be apparent that the drawbar will move laterally of the car as the car passes around curves in the tracks and that the drawbar will always be in a line between the center of its own truck and the center of the truck to which it is coupled of the adjoining car. Also, it will be obvious that when tensional forces are being exerted by the drawbar 46 on the truck the roller members 44 may roll on the outer arcuate track or surfaces 42 and that when compressional forces are being exerted thereby they may roll on the inner track 43.

The opposite end 15 of the truck frame 13 is likewise provided with a guide member 50, which is suitably secured to the frame of the truck. The guide member 50 is provided with a recess 51 bounded by an inner arcuate surface 52, and an outer arcuate surface 53, both representing arcs drawn about the axis of the center of the truck. Confined between the arcuate tracks 52 and 53 are two roller members 54 which are slightly smaller in diameter than the distance between the arcuate surfaces 52 and 53, as previously described in connection with the rollers 44. The rollers 54 are rotatably mounted upon a supporting member 55 which constitutes a part of a link or internal drawbar 56.

The supporting member 55 has secured thereto a short bar 57 on which is rigidly mounted a housing 58 which in turn is bolted or otherwise suitably secured to a second housing 59, the two housings together forming a cylinder. The housing 59 is provided at its central portion with an opening 60 within a guiding sleeve 61. A link member 62 extends through the opening 60 and has mounted on its extreme end a piston 63, which slides within the cylinder 58, 59. The sleeve 61 serves as a guide for the link member 62. A compression spring 64 is disposed within the cylinder formed by the housings 58 and 59, having one end in engagement with the inner wall of the housing 58 and having its other end in engagement with the piston 63, so as to resiliently maintain the piston in engagement with the end of the housing 59. The spring 64 is under tension in the position shown in Fig. 2 so as to prevent any looseness in this connection and so that a considerable force may be transmitted therethrough before the piston 63 leaves the end of the housing 59.

With this construction it is apparent that the link 62 will move about the vertical axis of the truck when the truck rotates with respect to the car body, and will exert either a tension on the arcuate surface 53 or a compressive force of the arcuate surface 52, but that the effective center of application of any forces transmitted thereby will be at the central point of the truck. The opposite end of the rod 62 is connected by means of a similar housing member 59 to a corresponding housing member 58 and link 57 to an arcuate support mounted on the adjacent end of the second truck of the car, so that through the links 62 a construction adapted to transmit forces between the trucks of the individual car is provided.

It will be apparent that any tensional forces will be transmitted directly from truck to truck through the links 57 and the housings 58 and 59 to the pistons 63 to the links 62, and that any normal or relatively small compressive forces being exerted between the trucks through the link 62 will be transmitted through the pre-loaded compression spring 64 and that any abnormally high compressive forces will cause the spring 64 to be compressed, causing the piston 63 to move out of engagement with the end surface of the housing member 59 for reasons hereinafter to be described.

The arcuate guide member 40 is likewise provided with an interior face 70 which is also cylindrical and in horizontal cross-section represents an arc about the axis of the center bearing of the truck when the bolster is in its normal central position. A floating block 71 rests on the truck frame 14 and is provided with an arcuate face 72, adapted to contact the face 70, and a flat vertical face 73, which is adapted to contact a corresponding face 74 on a shoulder member 75, mounted on the bottom of the car body 10 adjacent each end thereof. The floating block 71 should be so constructed that its contacting faces 72 and 73 may be readily lubricated and should be machined so as to provide surfaces which will present as little friction as possible to the movement of the faces 70 and 74 while in engagement therewith. Under certain circumstances the surface 73 engages the surface 74 and at that time relative motion of the car body 10 and the truck frame 13 must be permissible. This is provided by the combination of the arcuate surface 72 and the flat face 73. The arcuate surface 72 engaging the arcuate face of the guide member 40 permits of rotation of the truck with respect to the car body about the center bearing as an axis without disengaging the faces 72 and 76, and the flat face 73 permits of sliding of the flat face 74 either vertically, when the car moves up and down on its springs, or in an arcuate direction about an axis extending longitudinally of the car body, as when the car body is inclined or tilted by centrifugal force acting thereon. The lower edge of the shoulder 75 should preferably be arcuate so as to avoid engaging any portion of the truck frame as the car rotates or tilts about its longitudinal axis.

The drawbars 46 should be of such length as to prevent any possibility of the end of one car body contacting the end of an adjacent or coupled car body, thus preventing the transmission of disturbing forces arising therefrom. In addition, the bellows members 80, by means of which two cars are interconnected so as to prevent injury to passengers passing from one car body to an adjacent car body, should also be of such nature so as to be incapable of transmitting any force between the car bodies which they interconnect.

In the structure which I have described it will be apparent that when the engine exerts a tension on the train, so as to propel it forwardly, a tension will be exerted on the drawbar 46. This in turn will pull the rollers 44 into engagement with the arcuate face 42, thus transmitting the tension to the truck frame 13. The truck frame 13 will transmit this force to the guide member 50 at the opposite end thereof, from which the arcuate face 53 will transmit the force to the roller members 54 and thus to the link 57 and housing 58. The housing 59 will likewise transmit the force to the link 62 and through it to a corresponding but reversed arrangement in the truck supporting the other end of the car body 10. The car body 10, however, rests upon the track member 32, and it, in turn, upon the bolster 25 and, when the trucks move forwardly, the car body lacking inertia is urged forwardly by the rear compression springs 27 between the truck frame and the bolster 25 thus compressing the springs and resiliently urging the car body forwardly. This is true of both trucks supporting the car body and provides for a cushioned application of starting or accelerating forces thereto. In the event that the tension impressed on the drawbar 46 is very high, the spring 27 may have insufficient force to accelerate the car body at the same rate as the trucks are being accelerated, in which event the shoulder 75 at the rear end of the car will engage the floating block 71 resting against the inner face of the guide member 40 on the rear truck thus providing a safety construction to guard against accidents but will normally not be necessary.

When compressive forces are exerted on the drawbar 47, for example, when the engine pushes the train, the force is transmitted to the arcuate face 43 of the guide member 40, and thence to the truck frame. From the truck frame it is transmitted to the guide member 50 at the opposite end of the truck frame, through the roller 55 and the link 57 through the compression spring 64 and thence to the piston 63 on the link 62. From the link 62 it passes through a corresponding compression spring and guide member at the adjacent end of the other truck of the car, thence through the truck frame to the coupling member at the opposite end thereof. Any moderate force being transmitted in this manner will thus be transmitted between the trucks through the compression springs 64, which provide a cushioning effect, but any force in excess of a moderate compression force compresses the springs 64 sufficiently to permit the block member 73 to engage the shoulder 75 on the car body, causing the shoulder 75 at the opposite end of the car body to engage the corresponding floating block at that end, thus transmitting forces in excess of those which can be transmitted by the compression spring 64 directly through the car body itself. This results in movement of the two trucks toward each other with respect to the car body 10, which is permitted by reason of the fact that the bolsters 25 may slide within the depressed portion 18 of the truck frame. As a result, the two outside springs of the compression springs 27 at each end of the car are likewise compressed thus serving as a further cushion to the impact on the car body occasioned by transmitting the compressive forces directly through the car body. Under normal circumstances, when compressive forces are exerted on the car body, it will be moved through the compression springs 26 of the two trucks by reason of the fact that the trucks will move under the compressive forces and the springs 26 will yieldingly urge the car body 10 to move therewith.

From the foregoing description it will be apparent that the car body is free of all forces under normal circumstances of operation, thus permitting the car body to move freely on its supporting springs and permitting it to tilt upon a predetermined longitudinal axis in response to centrifugal forces exerted thereon. This will be true with respect to all tensional forces and with respect to the majority of the compressional forces but relatively high compressional forces, which sometimes become excessive, are transmitted through the car body but this is accomplished through the floating blocks 71 at each end of the car body, thus permitting movement thereof with respect to the truck frames even during this period of operation. As the periods of operation during which frictional forces of this degree are in existence are relatively small there is comparatively no interference with the free operation of the car body owing to this cause and at the same time the assumption of the excess compressive forces by the car body permits of the use of a relatively light weight interconnecting link or internal drawbar which would otherwise necessarily be of considerable weight in order to provide the essential rigidity.

At the same time it will be apparent that the car body 10 is movable longitudinally of the truck frames owing to the fact that the bolsters 75

25 are longitudinally movable and are resiliently urged to move with the truck frames by means of the compression springs 26 or 27, as the case may be.

As the internal drawbar 56 is mounted at each end in arcuate guides on the inner ends of the truck frames, and as these internal drawbars are not extensible although compressible, it will be apparent that the distance between the center bearings, and therefore the centers of suspension of the truck frames, never exceeds a predetermined amount as determined by the length of the internal drawbars, and that tensional forces may therefore be transmitted through the car to adjacent cars without any alteration in the distance between the truck center bearings.

The compressional springs 26 and 27 in effect provide a draft or cushioning means between the bolster, which moves with the car body, and the truck frames during the transmission of both tensional and compressional forces through the car body and these springs provide cushioning means additive to those of the compression spring 64 in transmitting excessive compressional forces through the car body.

Although I have illustrated but one form of my invention and have described in detail but a single application, it will be apparent to those skilled in the art that it is not so limited but that various modifications and changes may be effected therein without departing from the spirit of my invention or from the scope of the appended claims.

What I claim is:

1. In a railway vehicle, a car body, two spaced trucks adapted to support said car body, car couplings secured to said trucks, means interconnecting said trucks including relatively movable members held against relative movement in one direction to transmit tension forces through said vehicle independently of said car body, means acting between said members during relative movement thereof in an opposite direction to transmit limited relatively light compression forces through said vehicle independently of said car body, and means for transmitting any compression forces in excess of said relatively light forces through said car body.

2. In a railway vehicle, a car body, two spaced trucks adapted to support said car body, car couplings secured to said trucks, means interconnecting said trucks including relatively movable members held against relative movement in one direction to directly transmit all tensional forces from one truck to the other independently of said body, and means acting between said members during relative movement thereof in an opposite direction for directly transmitting a portion only of compressive forces from one truck to the other.

3. In a railway vehicle, a car body, two spaced trucks adapted to support said car body, car couplings secured to said trucks, means interconnecting said trucks comprising an inextensible compressible link member having relatively movable elements normally positively held against relative movement in one direction and a resilient member positioned between said elements yieldably opposing relative movement of said elements in an opposite direction.

4. In a railway vehicle, a car body, two spaced trucks adapted to support said car body, car couplings secured to said trucks, means interconnecting said trucks comprising a link member pivotally connected to each of said trucks, said link member comprising a resiliently collapsible portion having relatively movable elements normally positively held against relative movement in one direction and a resilient member positioned between said elements yieldably opposing relative movement of said elements in an opposite direction.

5. In a railway vehicle, a car body, two spaced trucks adapted to support said car body and pivotally associated therewith, means interconnecting said trucks comprising a link member pivotally associated with the center of suspension of said trucks, said link member comprising two relatively movable portions slidable one on the other, means for preventing the extension and permitting the contraction of said link member and flexible means resiliently opposing the contraction of said link member.

6. In a railway vehicle, two spaced trucks, each of said trucks having a truck frame, a bolster member longitudinally slidably mounted on said frame, means for resiliently opposing longitudinal movement of said bolster from a predetermined position on said frame, a center bearing mounted on said bolster member, a transversely extending track member means pivotally supporting said track member mounted on said center bearing, a transversely extending track mounted on said car body adjacent each end thereof, and roller members disposed intermediate said track members adapted to permit tilting of said body about an axis extending longitudinally thereof in response to centrifugal force acting thereon.

7. In a railway vehicle, two spaced pivoted trucks, each of said trucks having a truck frame, a bolster member slidably mounted on each of said frames, resilient means secured to said frames adapted to resiliently retain said bolster members in predetermined positions on said truck frames, means interconnecting said trucks comprising a non-extensible resiliently compressible link member pivotally associated with each of said trucks and movable relative thereto about the pivotal axis thereof, and drawbar means secured to each of said trucks at the ends of said vehicle.

8. In a railway vehicle, two spaced trucks having truck frames, a bolster member mounted on each of said truck frames and movable longitudinally thereof, springs disposed intermediate said bolster member and portions of the associated truck frame adapted to resiliently urge said bolster towards a central position on said truck frame, car coupling members pivotally secured to said trucks and means interconnecting said two trucks comprising a link member secured to each of said truck frames and pivotally movable about a central point on each of said truck frames, said link being inextensible in transmitting tension forces and compressible in transmitting compression forces.

9. In a railway vehicle, a car body, two spaced trucks each provided with frames and adapted to pivotally support said car body by means of center bearings, a link member interconnecting said truck frames and pivotally movable relative thereto about the center point thereof as an axis, and a car coupling member secured to each of said truck frames, said car couplings, truck frames and link member being movable with respect to said center bearings and car body longitudinally of the car body.

10. In a railway vehicle, two spaced pivoted trucks each provided with a truck frame, a link member pivotally connected to both of said truck frames and movable relative thereto about the pivotal axis thereof, said link member being inextensible and resiliently compressible, a coupling member pivotally associated with each of said trucks and movable relative thereto about the pivotal axis thereof, a car body, and means for mounting said car body on said truck frames comprising means adapted to permit tilting of said body about an axis extending longitudinally thereof in response to centrifugal force acting thereon.

11. In a railway vehicle, a car body, two spaced trucks each provided with truck frames, a car coupling member at each end of said vehicle, each coupling member being secured to a truck frame and pivotally movable about the center point thereof as an axis, an inextensible resiliently compressible link member interconnecting the two truck frames and pivotally movable relative thereto about the center points of said frames, and means for mounting said car body on said truck frames and adapted to permit tilting of said body about an axis extending longitudinally thereof and to permit rotation of said truck frames with respect to said car body about a vertical axis.

12. In a railway vehicle, a car body, two spaced trucks adapted to support said car body, car couplings secured to said trucks, means interconnecting said trucks comprising a lost motion linkage having relatively movable elements normally positively held against relative movement in one direction to transmit tension forces from one truck to the other independently of said car body, a resilient member yieldably opposing relative movement of said elements in an opposite direction for transmitting moderate compressive forces from one truck to the other independently of said car body, and means operable after a predetermined amplitude of relative movement of said elements in said last-mentioned direction for transmitting excessive compression forces from one truck to the other through said car body.

ROBERT N. JANEWAY.